United States Patent
Kling et al.

(10) Patent No.: US 6,442,470 B1
(45) Date of Patent: Aug. 27, 2002

(54) DETERMINATION OF ROAD CONDITIONS IN A NON-BRAKING OR PARTIALLY BRAKING VEHICLE

(75) Inventors: Wolfgang Kling, Frankfurt am Main; Robert Schmidt, Rennerod, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/647,048

(22) PCT Filed: Mar. 29, 1999

(86) PCT No.: PCT/EP99/02155

§ 371 (c)(1),
(2), (4) Date: Dec. 16, 2000

(87) PCT Pub. No.: WO99/50114

PCT Pub. Date: Oct. 7, 1999

(30) Foreign Application Priority Data

Mar. 31, 1998 (DE) .......................... 198 14 208
Mar. 8, 1999 (DE) .......................... 199 10 099

(51) Int. Cl.$^7$ .................................................. G06F 7/00
(52) U.S. Cl. ....................... 701/80; 701/70; 701/74; 701/79; 303/146

(58) Field of Search ............................. 701/70, 71, 72, 701/74, 78, 79, 80, 81, 82; 303/136, 146, 191

(56) References Cited

U.S. PATENT DOCUMENTS

| 5,132,906 A | 7/1992 | Sol et al. |
| 5,353,225 A | 10/1994 | Tsuyama et al. |
| 5,406,486 A | 4/1995 | Kamio et al. |
| 5,704,696 A | * 1/1998 | Monzaki ............... 303/146 |
| 5,717,591 A | * 2/1998 | Okada et al. ........... 701/82 |
| 5,839,799 A | * 11/1998 | Fukada ................. 303/146 |
| 6,182,001 B1 | * 1/2001 | Sugai et al. ........... 701/78 |

FOREIGN PATENT DOCUMENTS

| DE | 0 575 944 | 12/1993 |
| EP | 0 621 162 | 10/1994 |

* cited by examiner

Primary Examiner—William A. Cuchlinski, Jr.
Assistant Examiner—Gertrude Arthur
(74) Attorney, Agent, or Firm—Rader, Fishman & Grauer PLLC

(57) ABSTRACT

The invention consists in the determination of road conditions during unbraked or partially braked ride of a vehicle through a time derivative of characteristics which are detected on at least one wheel of the vehicle and whose averages are created.

24 Claims, 1 Drawing Sheet

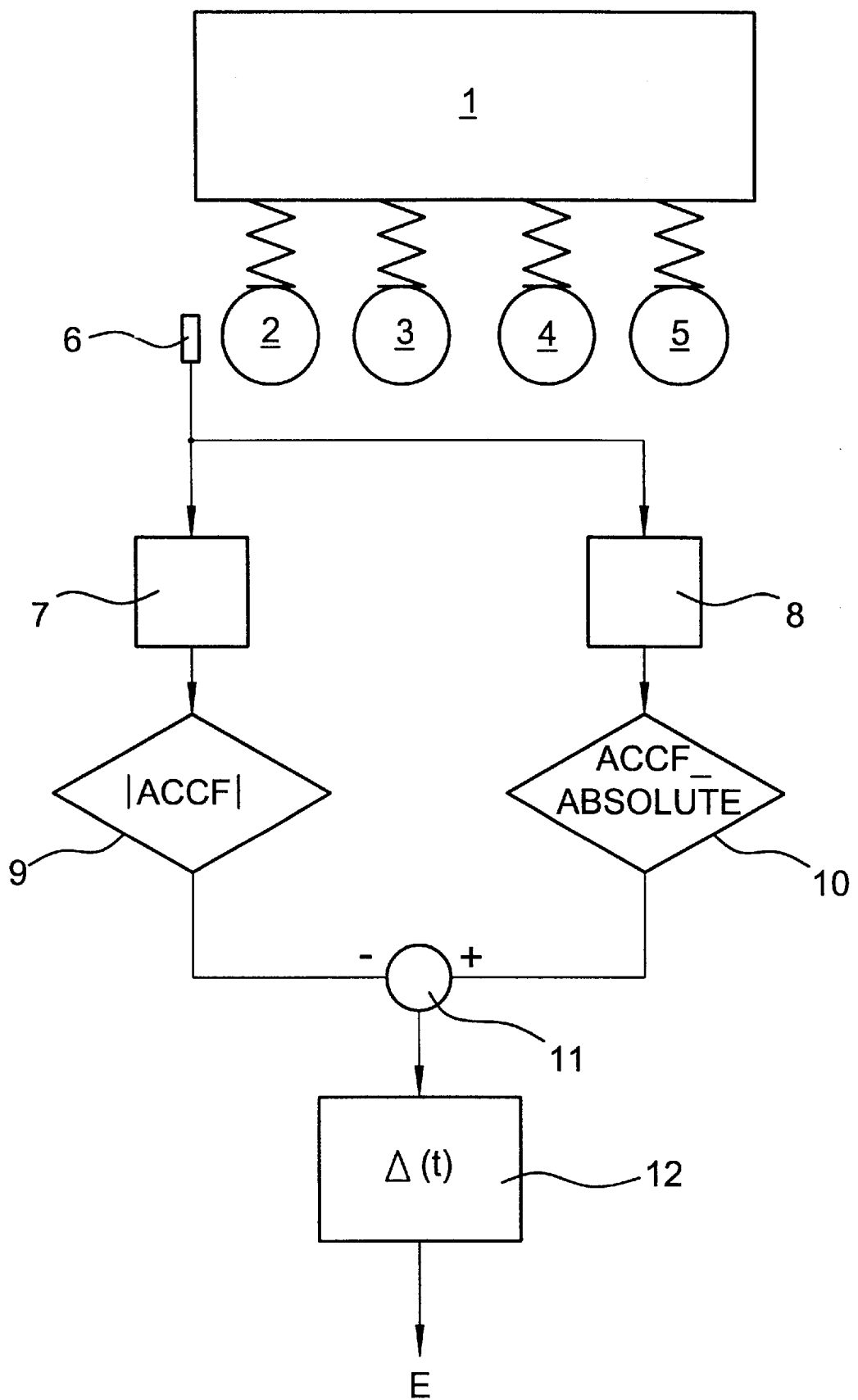

DETERMINATION OF ROAD CONDITIONS IN A NON-BRAKING OR PARTIALLY BRAKING VEHICLE

TECHNICAL FIELD

The invention relates to a method for determining road conditions.

BACKGROUND OF THE INVENTION

A method of this kind is required in order to be able in vehicles to adapt the rotational behavior of the wheels to the friction conditions on the road and to the road conditions. The vehicles provide brake systems in which the wheel brake pressures are adjustable and controllable independently of the force exerted on the brake pedal by the driver.

In an anti-lock system, the brake pressure is controlled in the way that the wheels, during full braking, turn with a slip at which high braking forces as well as high lateral forces can be transmitted. This has the result that the vehicle remains steerable during full braking.

Also other brake pressure controls are known. For instance, in a traction control, it is attempted to prevent spinning of the driven wheels during starting. In a driving stability control, swerving of the vehicle around its vertical axis is supposed to be prevented by selective brake pressure is applied to specific wheels.

The control algorithms developed for brake pressure controls are based on that, from signals of the wheel sensors detecting the rotational behavior of the wheels, a vehicle reference speed is derived and that, by means of a control algorithm, it is attempted to adapt the respective wheel speed, i.e. the angular speed of the wheel, to the vehicle reference speed in the sense of optimum slip.

In the control algorithm, vehicle-specific limit values are defined, at whose occurrence an adaptation of the brake pressure sets in.

Accordingly, wheel decelerations are defined so that the brake pressure can be reduced when the vehicle wheels decelerate too strongly, i.e. have the tendency to lock. In this way, the wheel slip can be kept within narrow limits. The threshold values of the control are defined for solid, smooth road surfaces independently of the friction value of the road.

During braking on wavy or bumpy, rough road surfaces (bad track), it does not appear to be appropriate to compute with values which have been defined for smooth surfaces. It could actually be determined that on bad-track roads the braking distances are extended. This can be attributed to the fact that, due to swaying of the vehicle on wavy ground, the wheel loads of the individual wheels change very severely, whereby the adaptation of the wheel speed to the vehicle reference speed cannot be carried out optimally.

It has therefore already been suggested for the mentioned cases to adapt the intervention thresholds of the control algorithms that were defined for solid, smooth road grounds in the sense that higher slip values are permitted.

From U.S. Pat. No. 4,969,100, a method for determining a vehicle reference speed is known which is derived from signals supplied by the wheel sensors. At the same time, an accelerometer is provided, whose values are compared to the reference speed or with a reference vehicle acceleration derived therefrom, respectively. In the case of a deviation, the method for determining the reference speed is changed.

Furthermore, it is known to compare the longitudinal acceleration of the vehicle body with the reference vehicle speed derived from the wheel speeds and, in case of a difference, to derive intervention criteria.

The previous algorithms for determining of road conditions are based on an analysis of the derived wheel speeds which are compared with characteristics which are either detected by another sensor, e.g. an accelerometer, or which are based on an evaluation of the wheel accelerations. Here, a periodic oscillation of the wheel frequency is expected when, with respect to the intervention thresholds of the normal control algorithms, the road ground comprises a deviating, e.g. wavy formation. The road conditions are recognized through the frequency and amplitude of the oscillation. The signal detection of these periodic oscillations of the wheel accelerations can typically only occur in a measuring quantity determined by the road conditions, which is not present on moderate bad-track roads to an extent necessary for detection. Thus, non-braked or partially braked ride on moderate bad-track roads results in statuses in which, due to road conditions not yet recognized, control events, e.g. during an anti-lock control, are initiated clearly before reaching the actual locking pressure level which lead to an increase of the stopping distances of the vehicles.

The invention is based on the objective to indicate a method with which road conditions can be identified which are arranged between the defined smooth road grounds and the extremely wavy road grounds.

This objective is achieved, according to the invention, by means of determination of road conditions during non-braked or partially braked ride of a vehicle through a time derivative of characteristics which are detected at the wheel of the vehicle and averaged.

The invention is based on the consideration that, only through the wheels directly influenced by the road, road conditions lead to characteristics by evaluation of which the road conditions can be described. Here, through the time derivative of the characteristics and their comparison, an image of the road conditions can be attained. According to the invention, as characteristics, the turn behavior of the wheels or the wheel speeds, respectively, are differentiated with respect to time. Through a comparison of the arithmetical average with the average of the absolute values, even moderate bad-track conditions can be portrayed, for, on smooth road grounds, the arithmetic average of the characteristics differ only slightly or not at all from the averages of the characteristics identified by means of the absolute values, whereas, already on moderately "bad tracks", a significant difference arises between the averages. The invention herefor utilizes the temporal course of the wheel acceleration values which reflect positive as well as negative values of the change of speed. For averaging, a filter or low pass is used which creates the filtered absolute value ACCF_ABSOLUTE(n) according to the relation $$ACCF\_ABSOLUTE(n)=ACCF\_ABSOLUTE(n-1) \cdot [(T-1)/T + |ACC(n)| \cdot (1/T)],$$

wherein ACCF is the filtered wheel acceleration, n the number of the current loop in which the average is created, T the filter time constant of the low-pass filter, and ACC the unfiltered wheel acceleration.

The arithmetic average ACCF is created by means of a filter or a low pass according to the relation $$ACCF(n)=ACCF(n-1) \cdot [(T-1)/T + ACC(n) \cdot (1/T)],$$

wherein ACCF is the filtered wheel acceleration, n the number of the current loop, in which the average is created, T the filter time constant of the low-pass filter, and ACC the unfiltered wheel acceleration.

With a loop time between 5 and 20 msec., the averages are created over a time interval in the order of magnitude between 50 and 200 msec.

If a difference greater than 0.2 g, preferably greater than 0.5 g, results from the comparison of the arithmetic averages of the characteristics with the average of the absolute values, an intervention signal can be generated herefrom which represents criteria for the determination of the road situation according to whose directive an intervention into the control algorithm for the brake pressure control is performed. Thus, in dependence on the recognized bad-track road, control thresholds can be adapted, a control of an anti-lock system too sensitive for the road can be avoided.

The characteristics are detected on each wheel of the vehicle, the averages are created and compared. The wheel-individual road conditions, within a brake pressure control method for a vehicle, permit intervention possibilities that, for example, consider one-sided road differences.

According to predetermined criteria, event signals can be issued, based on which the control algorithm for brake pressure control is adapted during anti-lock control, traction control, or driving stability control.

To this end, the determination of road conditions requires solely the existing wheel sensors for the detection of an angle-resolved signal whose time derivative represents the angular speed of the wheels or, short, the wheel speed. Further sensors are not required.

BRIEF DESCRIPTION OF THE DRAWING

FIG. 1 is a schematic of the method of the present invention.

Vehicle 1 is carried by means of four wheels 2,3,4,5, and generally known wheel suspensions. The turn behavior of each wheel can be detected by means of a so-called wheel sensor 6, where, for clarity reasons, a wheel sensor 6 is assigned only to wheel 2.

The wheel sensor 6 reproduces an angle-resolved signal whose time derivative represents the angular speed or, short, the wheel speed.

Based on these signals, the arithmetic average ACCF and the average of the absolute values ACCF_ABSOLUTE of the characteristics of the wheel acceleration can be created through evaluation units 7 and 8 by means of a time derivative. By putting the two signals 9, 10 into comparison in a subtractor 11, a measure E for the disturbances acting on a wheel 6 is obtained. The time constant used for creating the average corresponds to approximately 8 program loops. The scanning steps amount to approx. 7 msec.

An event signal 12 permits the conclusion that the vehicle is moved on wavy ground. Depending on the brake pressure control supposed to be influenced, further criteria can be derived from the event signal E, and an adaptation can be carried out.

The calculation of the absolute and arithmetic average at a negative acceleration of –0.3 g according to embodiment 1 reflects a "smooth road" and according to embodiment 2 a "bad-track road".

Embodiment 1

Starting Value –0.3 g ACCF or 0.3 g ACCF_ABSOLUTE, respectively

| ACC | –0.4 g | 0.1 g | –0.35 g | –0.25 g | –0.4 g | –0.3 g | –0.35 g | –0.33 g |
|---|---|---|---|---|---|---|---|---|
| ACCF | –0.3125 | –0.261 | –0.272 | –0.269 | –0.285 | –0.287 | –0.295 | –0.299 |
| ACCF_ABSOLUTE | 0.3125 | 0.2859 | 0.2939 | 0.2884 | 0.3024 | 0.3021 | 0.3081 | 0.3108 |

As a comparison of the values listed in Table 1 shows, ACCF-ABSOLUTE-|ACCF|<0,2 g, i.e. a smooth road is present.

Embodiment 2

Starting Value –0,3 g ACCF, or +0,3 ACCF_ABSOLUTE, respectively

| ACC | 1 | –1.25 | –0.5 | +0.7 | +0.3 | –0.6 | +0.3 | –0.7 |
|---|---|---|---|---|---|---|---|---|
| ACCF | –0.175 | –0.3093 | –0.3332 | –0.2041 | –0.141 | –0.1984 | –0.1361 | –0.2065 |
| ACCF_ABSOLUTE | 0.425 | 0.5812 | 0.571 | 0.5872 | 0.5513 | 0.5574 | 0.5252 | 0.5470 |

As a comparison of the values listed in Table 2 shows, ACCF-ABSOLUTE-|ACCF|>0,2 g, i.e. a bad-track road is present.

What is claimed is:

1. Method for determining road conditions during unbraked or partially braked ride of a vehicle, comprising the steps of:
    (A) detecting characteristics on at least one wheel of the vehicle,
    (B) determining an arithmetic average and an average of an absolute value from said detected characteristics over a predetermined period of time,
    (C) determining a difference between the arithmetic average and the average of the absolute value over the predetermined period of time, and
    (D) determining a road condition based on the difference between the arithmetic average and the average of the absolute value over the predetermined period of time.

2. The method according to claim 1, wherein said characteristics include a turning behavior of the individual wheels or a speed of the individual wheels.

3. The method according to claim 1, wherein the arithmetic average is determined using a low pass filter, which creates a filtered absolute value ACCF_ABSOLUTE(n) according to the relation:

$$ACCF\_ABSOLUTE(n)=ACCF\_ABSOLUTE(n-1)\bullet[(T-1)/T+ |ACC(n)|\bullet(1/T)],$$

wherein,
ACCF=filtered wheel acceleration,
n=number of the current loop or cycle,
T=filter time constant of the low-pass filter, and
ACC=unfiltered wheel acceleration.

4. The method according to claim 3, wherein ACCF(n) is determined according to the relation:

$$ACCF(n)=ACCF(n-1)\bullet[(T-1)/T]+ACC(n)\bullet(1/T)],$$

wherein,
ACCF=the filtered wheel acceleration,
n=number of the current loop,
T=filter time constant of the low-pass filter, and
ACC=unfiltered wheel acceleration.

5. The method according to claim 1, wherein an intervention signal E is generated when the difference between the arithmetic average and the average of the absolute value over the predetermined period of time exceeds 0.2 g.

6. The method according to claim 1, wherein an intervention signal E is generated when the difference between the arithmetic average and the average of the absolute value over the predetermined period of time exceeds 0.5 g.

7. The method according to claim 1, wherein the period of time is between 50 and 200 msec.

8. The method according to claim 1, wherein said characteristics are detected on a plurality of wheels.

9. Method for determining road conditions of a vehicle, comprising the steps of:
   (A) detecting a rotational speed of at least one wheel of the vehicle,
   (B) determining an arithmetic average and an average of an absolute value of an acceleration of the at least one wheel of the vehicle over a predetermined period of time, and
   (C) determining a road condition of the vehicle based on whether a difference between the arithmetic average and the average of the absolute value exceeds a predetermined value.

10. The method according to claim 9, wherein the arithmetic average is determined using a low pass filter, which creates a filtered absolute value ACCF_ABSOLUTE(n) according to the relation:

$$ACCF\_ABSOLUTE(n)=ACCF\_ABSOLUTE(n-1)\bullet[(T-1)/T+ |ACC(n)|\bullet(1/T)],$$

wherein,
ACCF=filtered wheel acceleration,
n=number of the current loop or cycle,
T=filter time constant of the low-pass filter, and
ACC=unfiltered wheel acceleration.

11. The method according to claim 10, wherein ACCF(n) is determined according to the relation:

$$ACCF(n)=ACCF(n-1)\bullet[(T-1)/T]+ACC(n)\bullet(1/T)],$$

wherein,
ACCF=the filtered wheel acceleration,
n=number of the current loop,
T=filter time constant of the low-pass filter, and
ACC=unfiltered wheel acceleration.

12. The method according to claim 9, wherein an intervention signal E is generated when the difference between the arithmetic average and the average of the absolute value over the predetermined period of time exceeds 0.2 g.

13. The method according to claim 9, wherein an intervention signal E is generated when the difference between the arithmetic average and the average of the absolute value over the predetermined period of time exceeds 0.5 g.

14. The method according to claim 9, wherein the predetermined period of time is between 50 and 200 msec.

15. The method according to claim 9, wherein said characteristics are detected on a plurality of wheels.

16. The method according to claim 9, wherein the road condition is one of a smooth road and a bad-track road.

17. Method for determining road conditions of a vehicle, comprising the steps of:
   (A) generating a first signal indicative of a rotational speed of at least one wheel of the vehicle,
   (B) generating a second signal indicative of an arithmetic average of an acceleration of the at least one wheel over a predetermined period of time,
   (C) generating a third signal indicative of an average of an absolute value of the acceleration of the at least one wheel over the predetermined period of time, and
   (D) generating a fourth signal indicative of a comparison of the second and third signals,
   whereby a first road condition exists when the fourth signal does not indicate that the wheel acceleration exceeds the predetermined value, and whereby a second road condition exists when the fourth signal indicates that the wheel acceleration exceeds a predetermined value.

18. The method according to claim 17, wherein the arithmetic average is determined using a low pass filter, which creates a filtered absolute value ACCF_ABSOLUTE(n) according to the relation:

$$ACCF\_ABSOLUTE(n)=ACCF\_ABSOLUTE(n-1)\bullet[(T-1)/T+ |ACC(n)|\bullet(1/T)],$$

wherein,
ACCF=filtered wheel acceleration,
n=number of the current loop or cycle,
T=filter time constant of the low-pass filter, and
ACC=unfiltered wheel acceleration.

19. The method according to claim 18, wherein ACCF(n) is determined according to the relation:

$$ACCF(n)=ACCF(n-1)\bullet[(T-1)/T]+ACC(n)\bullet(1/T)],$$

wherein,
ACCF=the filtered wheel acceleration,
n=number of the current loop,
T=filter time constant of the low-pass filter, and
ACC=unfiltered wheel acceleration.

20. The method according to claim 17, wherein an intervention signal E is generated when the difference between the arithmetic average and the average of the absolute value over the predetermined period of time exceeds 0.2 g.

21. The method according to claim 17, wherein an intervention signal E is generated when the difference between the arithmetic average and the average of the absolute value over the predetermined period of time exceeds 0.5 g.

22. The method according to claim 17, wherein the predetermined period of time is between 50 and 200 msec.

23. The method according to claim 17, wherein said characteristics are detected on a plurality of wheels.

24. The method according to claim 17, wherein the first road condition is a smooth road and the second road condition is a bad-track road.

* * * * *